(12) United States Patent
Olliges

(10) Patent No.: US 7,324,321 B2
(45) Date of Patent: Jan. 29, 2008

(54) DEGAUSSING APPARATUS

(76) Inventor: William E. Olliges, 5027 SW. Moore St., Palm City, FL (US) 34990

( * ) Notice: Subject to any disclaimer, the term of this patent is extended or adjusted under 35 U.S.C. 154(b) by 0 days.

(21) Appl. No.: 11/466,237

(22) Filed: Aug. 22, 2006

(65) Prior Publication Data
US 2007/0115602 A1     May 24, 2007

Related U.S. Application Data

(60) Provisional application No. 60/739,358, filed on Nov. 22, 2005.

(51) Int. Cl.
H01H 47/00     (2006.01)
(52) U.S. Cl. .................................... 361/149
(58) Field of Classification Search ............... 361/149, 361/267
See application file for complete search history.

(56) References Cited

U.S. PATENT DOCUMENTS

| | | | |
|---|---|---|---|
| 3,711,750 A * | 1/1973 | Huffman et al. ............ 361/151 |
| 4,157,581 A | 6/1979 | Keiichi et al. |
| 4,286,295 A | 8/1981 | Ipolyi |
| 4,423,460 A | 12/1983 | Jackson et al. |
| 4,551,782 A | 11/1985 | Seely et al. |
| 4,639,821 A | 1/1987 | Littwin et al. |
| 4,672,345 A | 6/1987 | Littwin et al. |
| 5,132,860 A | 7/1992 | Von Stein |
| 5,666,413 A | 9/1997 | Kempf |
| 5,721,665 A | 2/1998 | Schultz |
| 5,979,774 A | 11/1999 | Urushibata |
| 6,714,398 B2 | 3/2004 | Schultz |

* cited by examiner

Primary Examiner—Stephen W. Jackson
(74) Attorney, Agent, or Firm—McHale & Slavin, P.A.

(57) ABSTRACT

A degaussing apparatus having permanent magnets employing common center poles arranged to obtain a flux level gauss of twice the normal level by arranging permanent magnets to create an enhanced center pole effect having an increased flux path as compared to the use of complimentary permanent magnets. The magnets are rotatably mounted in a nonferrous housing allowing placement of magnetic materials, such as a hard drive, thereon. The magnets are rotated within the housing by use of an electric drive motor. The magnets are maintained a predetermined distance from the magnetic materials to be degaussed by use of a spacer, preferably a series of rollers. In operation, the magnetic material is placed upon the housing and upon operation of the electric drive motor, the magnets are rotated in a 360° pattern causing degaussing of the magnetic material and complete destruction of hard drive heads and coils.

8 Claims, 2 Drawing Sheets

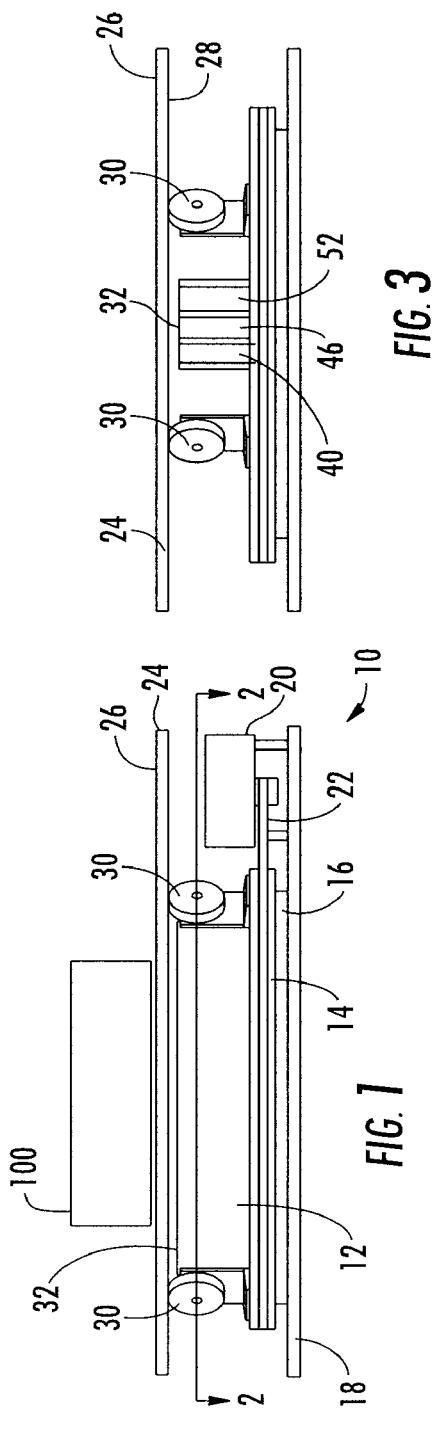

DEGAUSSING APPARATUS

RELATED APPLICATION

This non-provisional application which is based upon provisional application Ser. No. 60/739,358, filed on Nov. 22, 2005, claims benefit of the filing date thereof in accordance with 35 USC 119(e). Contents of said provisional application Ser. No. 60/739,358 are herein incorporated by reference.

FIELD OF THE INVENTION

The instant invention relates to magnetic recording media erasers and, in particular, to an apparatus that employs permanent magnets rotatably mounted with like center poles aligned to obtain a flux level gauss of 2x, or twice that of when opposite center poles are aligned. The rotatably mounted magnets are placed within a housing allowing placement of magnetic items to be degaussed, such as a computer hard drive, directly thereon.

BACKGROUND OF THE INVENTION

The reliance upon magnetic storage medium for storing confidential information is increasing exponentially. Magnetic storage can be used to store financial information, company trade secrets, top level government security information, and so forth. The ability for any unauthorized person to read such materials could be most damaging. Thus, the need to erase information from magnetic storage medium has become of paramount importance.

Magnetic tape or tracks on a magnetic disc can be erased by degaussing the magnetic media. Degaussing can be accomplished by applying magnetic fields of opposite polarity across the magnetized material. Hard drives are of particular interest as they are magnetic memory discs used in most every computer and are capable of storing gigabytes of information. While it was commonplace to repair computers when they failed, technological advances has made repair uneconomical and most computers are simply discarded should a failure occur. Data is transferred from the failed computer to the new computer, and the failed computer discarded. The hard drives may, or may not be removed, and the information stored thereon must be erased. Various devices employed to erase the information stored on hard drives by degaussing them are not known to obtain reliable and complete erasure of the information contained on the hard drive.

The complete destruction of the hard drive, including heads and coils has become paramount to the proper disposal of computers. However, these hard drives can be the most difficult to degauss to remove the information contained thereon. The prior art systems using permanent magnets do not address the problems of hard drive components that are not readily accessible, due to such factors as the sealing of the hard drive disk and/or head within an enclosure. In order to properly erase U.S. Government classified magnetic media having a high coercivity magnetic media, erasure in as many spatial planes as possible is necessary. Hard disc drives typically include magnetic coatings rising past hard coercivities of 3000 Oersteds.

Prior art magnetic information erasers utilize an iron core having coils wound thereon to create magnetic flux lines in a given direction. In order to obtain random orientation of the magnetic particles in the magnetic medium, either the magnetic medium or the iron core would need to be rotated. Electric current in winding portions beyond the ends of the iron cores can compensate for fringing effects, while prior art devices using permanent magnets do not counter the fringing effects.

U.S. Pat. No. 4,157,581, discloses an eraser for magnetic tape employing magnets that are spaced apart with complementing poles positioned in the same direction. The permanent magnets are aligned so that the facing magnetic poles are of like polarity. The poles are spaced apart and manually rotated while the magnetic material is slid between the magnets.

U.S. Pat. No. 4,286,295, discloses the use of permanent magnets placed on individual rotating discs. Each disc is rotated in a circular motion and the magnetic media can be placed on a casement, the device moves the spinning magnets forward and aft of the magnetic material to be degaussed.

U.S. Pat. No. 4,423,460, discloses a mechanism for erasing magnetic material using a rotating magnetic field. These are electromagnets causing magnetic field by placement of pole faces of each structure to oppose each other and are spaced by an air gap with sufficient width to receive a tape carrier. The tape carrier is drawn between the magnets to allow for the degaussing.

U.S. Pat. No. 4,551,782, discloses an apparatus for degaussing magnetic storage media wherein the magnetic material is placed within a drawer. Upon movement of the drawer, an axial magnetic field is created in alternating directions while the magnetic material is rotated.

U.S. Pat. Nos. 4,639,821 and 4,672,345 discloses a degausser that employs a conveyor belt that moves magnetic material across a rotating magnet. The magnetic field passes through a supporting surface and degausses articles placed on the supporting surface. The magnet is rotatable above its axis thereby providing corresponding reversing positions.

U.S. Pat. No. 5,132,860, discloses the use AC and DC type degaussing having magnet poles of the same polarity disposed opposite each other so that a bucking field is induced. A DC magnetic filed is produced as magnetic media is passed thru a gap between the magnets. AC erasure can be brought about through the movement of the magnet media through two or more opposite polarity fixed fields.

U.S. Pat. No. 5,666,413, discloses a scrambler of the magnetic media for reusable magnetic tapes such as that employed in a micro cassette recorder. The device includes an enclosure having a magnet placed thereon in a surface to prevent engagement of the device with the magnet wherein the slot in the device causes directional placement of the tape.

U.S. Pat. No. 5,721,665, discloses the use of an electromagnet bulk degaussing. This device includes a means for recovery of the mechanism used for transporting magnetic media should it stall due to magnetic interaction with the media and the magnets. This device addresses bulk degaussing systems that cause a stall in the transportation system due to the heavy magnetic pole required for proper degaussing.

U.S. Pat. No. 5,979,774, is a device for erasing magnetic displays by the use of a U-shaped style magnet having opposing complimentary magnetic poles. The U-shape magnet requires a magnetic display sheet to be placed between the poles for destruction thereof.

U.S. Pat. No. 6,714,398, discloses the use of a container replacement of magnetic material therein having magnets placed on each side of the container. The device employs fixed magnetic north-north poles predisposed and spaced apart from a complementary set of magnets arranged so that the poles of the adjacent magnet interact to counteract fringing effects.

Thus, what is lacking in the art is a degaussing apparatus having permanent magnets that are rotatably mounted and whose common center poles are aligned to obtain a flux level gauss of 2× or twice that of when opposite center poles are aligned. The rotatably mounted magnets are placed within a housing allowing placement of the items to be degaussed directly thereon.

SUMMARY OF THE INVENTION

Disclosed is a degaussing apparatus employed to erase information contained on magnetic recording or storage media. The degaussing apparatus utilizes permanent magnets employing common center poles arranged to obtain a flux level gauss of 2× or twice the normal level. The magnets are rotatably mounted in a non ferrous housing allowing placement of a hard drive or other magnetic recording media on the housing. The magnets are rotated by a drive motor and maintained a predetermined distance from the material to be degaussed, such as a hard drive, by use of spacers. The magnets are rotated in a 360° pattern causing complete demagnetization of the magnetic recording material.

An objective of the invention is to provide a silent degaussing apparatus capable of irrevocably rending information stored on magnetic memory inaccessible.

Another objective of the invention is to provide a degaussing apparatus capable of deep level degaussing without the need for electromagnets and the problems associated therewith, such as noise and radio interference.

Another objective of the invention is to provide a degaussing apparatus that does not generate heat and has no duty cycle.

Another objective of the invention is to provide a degaussing apparatus with a magnetic field of contact through the range of the permanent magnets by 360° rotation thereof.

Still another objective of the invention is to provide a degaussing apparatus having a flux level gauss of 2× or twice the normal level by use of at least three permanent magnets, a first permanent magnet having a polarity pole fastened to a second permanent magnet having the same polarity pole, the same polarity poles being positioned adjacent each other, said second permanent magnet also having an opposite polarity pole fastened to a third permanent magnet having the same opposite polarity pole, the opposite polarity poles being positioned adjacent each other.

Yet still another objective of the invention is to provide a degaussing apparatus having a flux level gauss of 2× or twice the normal level by arranging permanent magnets to create an enhanced center pole effect having an increased flux path as compared to the use of complimentary permanent magnets.

Still another objective of the invention is to provide a degaussing apparatus having a timer that turns off magnet rotation after sufficient rotations to have caused degaussing.

Still another objective of the invention is to teach the juxtapositioning of similar pole magnets to address the fringing problem by placing more pole surface toward the edges of a degaussing pathway.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 is a pictorial side view of the degaussing apparatus;

FIG. 2 is a top sectional view along line 2-2 of FIG. 1;

FIG. 3 is a pictorial end view of the degaussing apparatus;

DETAILED DESCRIPTION OF THE INVENTION

Figure 4:
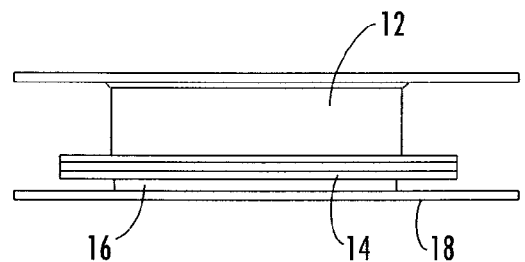
FIG. 4 is a dimensional side view of the magnet and base plate.

Now referring to FIG. 1, the degaussing apparatus 10 consists of a magnet assembly 12 mounted to a non-ferrous rotatable plate 14. The plate, preferably constructed from aluminum, rotates upon a turntable bearing assembly 16 capable of supporting the weight of the magnet assembly and allows for rotation of plate 14 with minimal friction. The turntable bearing assembly 16 is secured to a base or bed plate 18. Base plate 18 is sufficiently rigid to support a drive motor 20 and a coupling between the drive motor and plate 14. The drive motor is preferably an AC motor, although battery power (DC) is an alternative if portability is desired. The drive motor 20 is coupled to the turntable 14 by a drive belt 22, as seen in FIG. 2, which encircles turntable 14 thereby providing rotation for the magnet assembly 12, in a preferred embodiment. Alternatively, a direct connection can be established between the drive motor and the turntable or alternative types of transmission mechanisms can be installed between the drive motor and the turntable such as a chain or a plurality of gears. The drive motor can be plugged into an AC electrical outlet for operation. Also, an on/off switch can be employed to control the operation of the drive motor. A timer switch can also be employed to control the motor. The timer switch will turn off the motor after a predetermined period of time has lapsed. The lapsed time can correspond to a given number of rotations of the magnetic assembly.

As will be discussed in more detail later in this specification, the magnet assembly is based upon the use of permanent magnets having mutually repelling poles coupled together thereby yielding increased magnetic flux patterns. These increased flux patterns cause magnetic erasure in all three spatial planes (normal, transverse and longitudinal) of the magnetic media through which it passes. The rotating magnetic assembly 12 is placed within a housing which includes a top cover 24 having an upper surface 26 and lower surface 28. The top cover 24 is spaced above the rotating magnetic assembly 12 a predetermined distance by the use of roller bearings 30. The roller bearings are secured to the turntable 14 thereby maintaining the spacing of the lower surface 28 of cover 24 from the rotating magnet assembly 12 by a predetermined distance. In this manner an object to be degaussed 100 can be placed upon the upper surface 26 of the cover 24 and the magnetic attraction from the magnetic assembly will not be sufficient to cause the object being degaussed 100 from being attracted to and engaging the rotating magnetic assembly 12 thereby allowing rotation of the assembly thereof without interference.

The proper spacing optimizes the magnetic field projected onto the object being degaussed. In addition to the illustrated wheels the roller bearings can also be cylindrical elements and spherical elements. Such predetermined distance may also be maintained by the use of low friction material such as a polypropylene material.

FIG. 2 illustrates a top sectional view of the turntable 14, with the cover 24 removed, illustrating the rotating magnetic assembly 12, rotatably driven by a drive belt 22 and a drive motor 20. Roller bearings 30 are spaced along each corner of the rotating magnetic assembly 12 to support the object being degaussed. The roller bearings must be capable of supporting the weight of the object being degaussed so as to prevent crushing of the cover 24 thereby causing the object being degaussed to engage the upper surface 32 of the rotating magnet assembly. The speed of rotation of the magnetic assembly 12 is preferably 60 rotations per minute which is suitable for demagnetizing most conventional hard drives. The speed of rotation of the magnets may be increased or decreased depending on the degaussing requirements, e.g. the object being degassed and the magnetic field generated by the magnetic assembly. Rotation of the magnet assembly provides an unusually effective degaussing operation thereby allowing degaussing to occur in a very short period of time. The object 100 being degaussed or demagnetized is, to a certain degree magnetized, thereby necessitating the degaussing operation. Rotation of the magnetic assembly causes magnetization that was performed in a first position to be overcome by magnetization in an opposite direction. Accordingly, the successive rotations of the magnet producing opposite polarities allows for a smaller magnetic field force to efficiently degauss the material. The base or bed plate 18 is preferably made out of a nonferrous material and can be sized to accommodate a particular application, such as hard drives, yet still remain compact and lightweight. The placement of the turntable within a closed housing further decreases any noise made from the bearing support and eliminates the need for conveyor belts or other items used in moving an item to be degaussed past a magnet.

Figure 5:
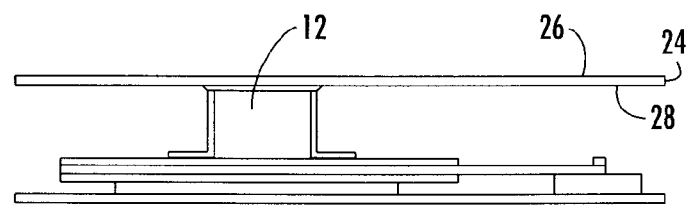
FIG. 5 is a dimensional end view of the magnet and base plate.

Referring now to FIGS. 4 and 5, wherein is illustrated a side and an end view of the rotating magnetic assembly 12 thereby providing a dimensional aspect of the turntable 14, preferably ½" thick, placed upon the rollers to create the turntable bearing 16. The magnet 12 is preferably 1½" thick with a preferred spacing from the base plate 18 to the lower surface 28 of the cover 24 with a spacing of 1.56 inches. The overall height of the unit can be maintained around 2½" allowing for a desk top degaussing apparatus. The drive motor 20 of FIG. 5 is a similar but different type than the one of FIGS. 1 and 2.

Figure 6:
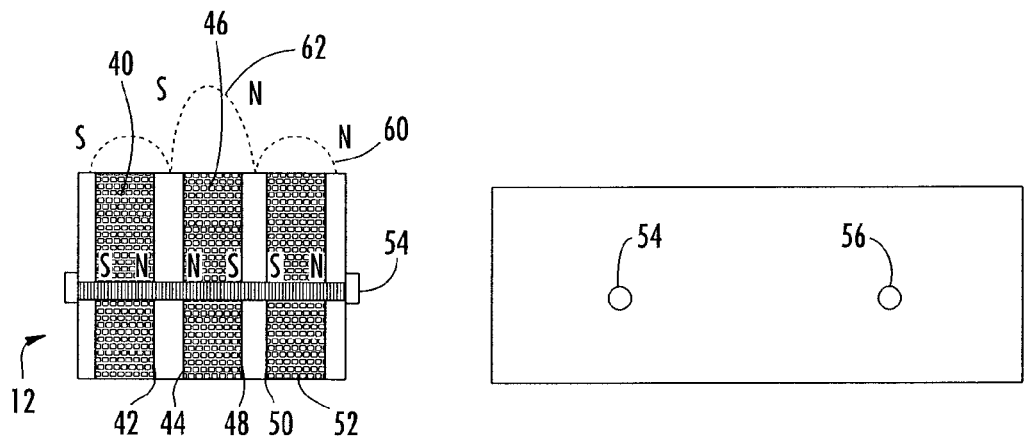
FIG. 6 is an end view of the magnet assembly.
Figure 7:
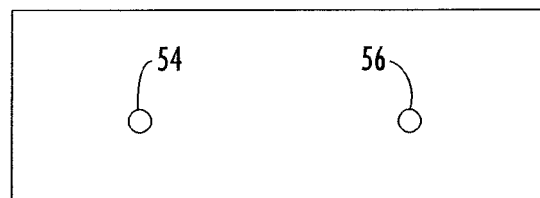
FIG. 7 is a side view of the magnet assembly depicting non-magnetic bolt couplings.

FIGS. 6 and 7 depict the use of the magnet assembly 12 of a preferred embodiment having at least three permanent magnets having a first permanent magnet 40 having a north polarity 42 coupled to a north polarity 44 of a second permanent magnet 46. A south polarity 48 of the second permanent magnet 46 is coupled to the south polarity 50 of a third permanent magnet 52. The common polarities are bolted together by use of non-magnetic bolts 54 and 56. Stainless steel is a preferred material for bolts 54 and 56. Alternative fastening means can also be employed. FIG. 6 depicts a normal flux gauss of X, for example 5,000 gauss, on the third magnet 52 as illustrated by a flux field level depicted by the numeral 60. The complimentary portion of the central magnet increases the flux level gauss two times, to 10,000 gauss, and shown by the flux path depicted by reference numeral 62. The degree of flux penetration in the normal spatial plane has been found to be most enhanced when the similar polarities of the magnets are physically attached. As illustrated in FIGS. 6 and 7 the permanent magnets are rectangular plate type magnets. Other different shapes of magnets could also be employed such as disc, circular, polygonal, etc.

In summary, the degaussing apparatus is based upon a nonferrous housing having a top wall 24 defined by an upper surface 26 and a lower surface 28. At least three permanent magnets 12 are secured to a rotatable plate 14 mounted beneath the top wall 24. The first permanent magnet 40 has a polarity pole 42 fastened to a second permanent magnet 46 having the same repelling polarity pole 42. The second permanent magnet 46 having a polarity pole 48 fastened to a third permanent magnet 52 having the same repelling polarity pole 50. The means for spacing the magnets 12 a predetermined distance from the top wall 24 is preferably by use of roller bearings 30. The means for rotating the plate 14 and magnet assembly 12 is a flexible drive belt 22 preferably driven by a drive motor 20. Placement of a magnet material 100 on the upper surface 26 of the top wall 24 results in the material 100 being degaussed upon rotating the magnets 12 within the housing 10.

The degaussing is by the steps of securing at least three permanent magnets 40, 46, & 52 to a rotatable plate 14. The first permanent magnet 40 having a polarity pole 42 fastened to a second permanent magnet 46 having the same repelling polarity pole 44, said second permanent magnet 46 having a polarity pole 48 fastened to a third permanent magnet 52 having the same repelling polarity pole 50. A nonferrous cover 24 is placed over the permanent magnets whereby the rotating of the magnets causes erasure of any material placed on said cover.

In addition to hard drives for computers, floppy discs, CD's, magnetic recording tape, magnetic card stripes, etc. can also be degaussed and the information thereon erased.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific forms or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary and are not intended as limitations on the scope. Changes therein and other uses will occur to those skilled in the art which encompassed within the spirit of the invention and are defined by the scope of the appended claims. Although the invention had been described in connection with the preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A degaussing apparatus comprising:
   a nonferrous housing having a top wall defined by an upper surface and a lower surface;
   a magnetic assembly comprising at least three permanent magnets secured together and to a rotatable plate mounted beneath said top wall, each said permanent magnet having a pole with a first polarity and a second pole with a polarity opposite that of said first polarity, a first permanent magnet having a pole with a first polarity fastened to a second permanent magnet, the poles of each said first and said second permanent magnets facing each other being the same; said second permanent magnet having a second pole with polarity opposite that of said first polarity fastened to a third permanent magnet, the poles of each of said second and said third permanent magnets facing each other being the same and opposite that of said first polarity;
   means for spacing said magnetic assembly a predetermined distance from said top wall;
   means for rotating said magnetic assembly;
   whereby placement of a magnet material on said upper surface of said top wall results in degaussing of said magnetic material upon rotation of said magnetic assembly within said housing.

2. The degaussing apparatus of claim 1 wherein said magnetic assembly is substantially rectangular with the elongate faces of each said magnets facing each other.

3. The degaussing apparatus of claim 1 further including means to secure said permanent magnets together.

4. The degaussing apparatus of claim 3, wherein said means to secure said permanent magnets together comprises fastening elements extending through said permanent magnets and secured to said magnetic assembly at the outer portions of said assembly.

5. The degaussing apparatus of claim 1 wherein said magnetic assembly is rotated in a plane substantially parallel to said upper surface.

6. The degaussing apparatus of claim 1 wherein said means for rotating said magnetic assembly comprises an electric motor, a rotary base on which said magnetic assembly is mounted and a drive transmission operatively connected to said rotary base and said electric motor whereby when said electric motor is operated the drive transmission conveys the rotary motion of said electric motor to said rotary base thereby turning said magnetic assembly.

7. A method of erasing magnetic recording media comprising:
   securing at least three permanent magnets to a rotatable base,
   securing said at least three permanent magnets to each other, each said permanent magnet having a pole with a first polarity and a second pole with a polarity opposite that of said first polarity; a first permanent magnet having a first polarity pole being secured to a second permanent magnet, the poles of each of said first and said second permanent magnets being the same and facing each other, said second permanent magnet having a second pole with a polarity opposite that of said first polarity fastened to a third permanent magnet, the poles of each of said second and said third permanent magnets being the same, opposite that of said first pole and facing each other;
   placing a nonferrous cover over said at least three permanent magnets;
   rotating said at least three permanent magnets to cause erasure of magnetic recording material placed on said cover.

8. The method of claim 7 wherein said at least three permanent magnets are rotated in a plane substantially parallel to said nonferrous cover.

* * * * *